UNITED STATES PATENT OFFICE.

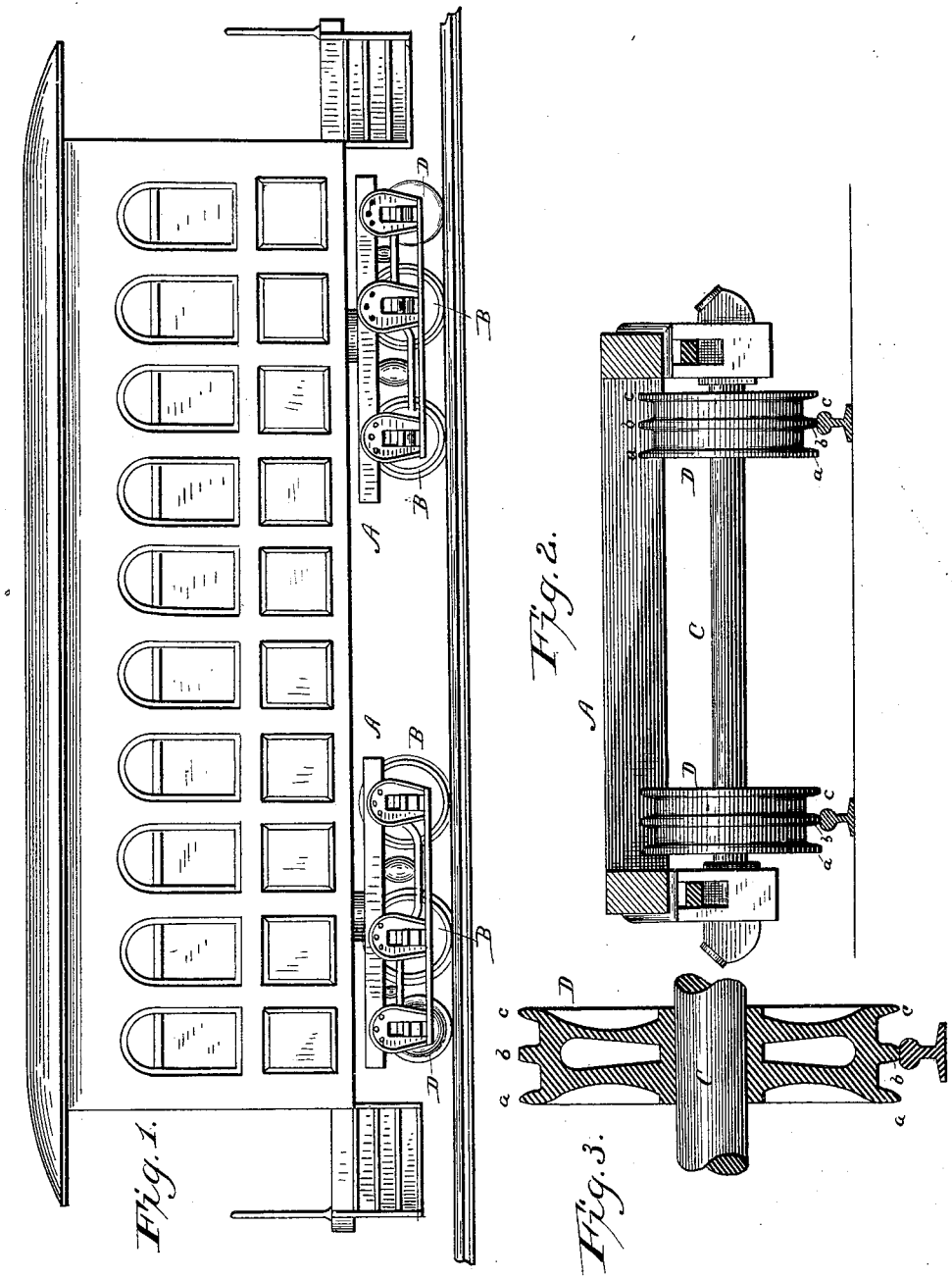

WILLIAM F. GRASSLER, OF WILLIAMSPORT, PENNSYLVANIA, ASSIGNOR OF ONE-HALF TO W. G. ELLIOTT, OF SAME PLACE.

SAFETY RAILWAY-CAR.

SPECIFICATION forming part of Letters Patent No. 367,000, dated July 19, 1887.

Application filed March 23, 1887. Serial No. 232,148. (No model.)

*To all whom it may concern:*

Be it known that I, WILLIAM F. GRASSLER, a citizen of the United States, residing at Williamsport, in the county of Lycoming and State of Pennsylvania, have invented certain new and useful Improvements in Safety Railway-Cars, of which the following is a specification, reference being had therein to the accompanying drawings.

This invention relates to certain improvements in railroad-cars; and it has for its objects to provide safety devices therefor, whereby the cars will be held to the track in case of the derailment of the ordinary wheels, so as to prevent the accidents so commonly occurring, and saving not only the rolling-stock of the roads, but the immense loss of life generally attendant upon railroad disasters. These objects I accomplish by the means illustrated in the accompanying drawings, in which—

Figure 1 represents a side elevation of a car, showing my invention applied thereto; Fig. 2, a transverse vertical sectional view of a car-truck, showing my invention; and Fig. 3, a detached vertical sectional view of a wheel constituting part of my improved safety device.

The letter A indicates the car trucks, which are of the usual construction, except that they are extended at one end for the purpose hereinafter explained. The trucks are mounted upon the usual flanged wheels, B, which travel on the rails in the ordinary manner. Between the extended portions of the trucks are journaled in suitable bearing-boxes the axles C, which carry the wheels D. The said wheels are each provided with three parallel circumferential flanges, $a$ $b$ $c$, and are so located that the central flange, $b$, runs normally on the top of the rail, as shown in Figs. 2 and 3 of the drawings, the wheels D being of such diameter relatively to the diameter of the flanged wheels at their tread that while the flanged wheels B are upon the track the flanges of the wheels D will be on a level with the tops of the rails of the track. The spaces between the flanges of the wheels D are of such width as to embrace the rails, so that when the ordinary wheels leave the track laterally the smaller wheels will take the track and keep the cars upon the rails, or will take the rails in case the same should spread laterally, so as to hold them from further spreading, and at the same time keep the car upon the track and thus prevent accidents.

It will be seen that provision is made for retaining the cars upon the track in case they jump the same to either side, by reason of the double spaces in the wheels C, which embrace the rails the moment the ordinary wheels leave the track and drop the wheels C upon said rails.

The additional wheels add but very little to the weight of the rolling-stock of the road, and are readily applied, involving no expensive alterations in the construction of the cars over the cost of the extended trucks.

Having thus described my invention, what I claim, and desire to secure by Letters Patent, is—

1. In a safety-car, the combination, with the trucks, mounted, as usual, upon the ordinary flanged wheels and having their side beams extended and provided with journal-boxes, of the auxiliary wheels and axle, the said wheels being constructed with three peripheral flanges, the central one of which is adapted to rest upon the rails, all arranged to operate substantially as described.

2. A safety or auxiliary car-wheel having a central peripheral flange adapted to run upon the rails, and two outer flanges serving to hold the car to the track should it become derailed, substantially as described.

3. A safety or auxiliary car-wheel provided with three peripheral flanges approximately in the same horizontal plane, the central flange being adapted to run normally upon the rails, and the spaces between the flanges being approximately the same size as the rails, for the purpose herein set forth.

In testimony whereof I affix my signature in presence of two witnesses.

WILLIAM F. GRASSLER.

Witnesses:
C. M. ALEXANDER,
M. P. CALLAN.